(12) United States Patent
Miller

(10) Patent No.: US 7,386,983 B2
(45) Date of Patent: Jun. 17, 2008

(54) APPARATUS FOR DRIVING AN ACCESSORY GEARBOX IN A GAS TURBINE ENGINE

(75) Inventor: Guy Wallace Miller, Gilford, NH (US)

(73) Assignee: United Technologies Corporation, Farmington, CT (US)

( * ) Notice: Subject to any disclaimer, the term of this patent is extended or adjusted under 35 U.S.C. 154(b) by 808 days.

(21) Appl. No.: 10/785,502

(22) Filed: Feb. 25, 2004

(65) Prior Publication Data

US 2005/0183529 A1 Aug. 25, 2005

(51) Int. Cl.
*F02C 7/32* (2006.01)
(52) U.S. Cl. ........................................................ 60/802
(58) Field of Classification Search ................... 60/802, 60/796–798, 226.1
See application file for complete search history.

(56) References Cited

U.S. PATENT DOCUMENTS

| | | | | |
|---|---|---|---|---|
| 2,952,973 A * | 9/1960 | Hall et al. | ...................... | 60/244 |
| 4,525,995 A * | 7/1985 | Clark | ........................ | 60/39.08 |
| 4,776,163 A * | 10/1988 | Brockmann | ................... | 60/792 |
| 5,309,708 A * | 5/1994 | Stewart et al. | ................. | 60/787 |
| 5,694,765 A * | 12/1997 | Hield et al. | .............. | 60/39.163 |
| 2005/0183540 A1* | 8/2005 | Miller | ................... | 74/665 GA |

* cited by examiner

*Primary Examiner*—Ted Kim
(74) *Attorney, Agent, or Firm*—Carlson, Gaskey & Olds

(57) ABSTRACT

A mechanical drive system for an accessory gearbox of a gas turbine engine is provided. The engine has a high-pressure drive shaft and a low-pressure drive shaft. The mechanical drive system includes a first tower shaft, a second tower shaft, a first lay shaft, and a second lay shaft. The first tower shaft is driven by the high-pressure drive shaft. The second tower shaft is driven by the low-pressure drive shaft. The first lay shaft is driven by the first tower shaft, and is connected to the accessory gearbox. The second lay shaft is driven by the second tower shaft, and is connected to the accessory gearbox.

6 Claims, 5 Drawing Sheets

APPARATUS FOR DRIVING AN ACCESSORY GEARBOX IN A GAS TURBINE ENGINE

BACKGROUND OF THE INVENTION

1. Technical Field

The present invention relates to gas turbine engines in general, and to apparatus for driving an accessory gearbox in particular.

2. Background Information

Aircraft powered by gas turbine engines very often include a mechanically driven accessory gearbox for driving accessory systems such as fuel pumps, scavenge pumps, electrical generators, hydraulic pumps, etc. The power requirements of the accessory gearbox continue to increase as the number of electrical systems within the aircraft increase. Historically, the accessory gearbox has been driven by a mechanical system connected to the drive shaft (i.e., the "high pressure drive shaft") extending between the high-pressure turbine and the high-pressure compressor of the gas turbine engine. The ability to tap power off of the high-pressure drive shaft is limited, however. What is needed is an apparatus for mechanically driving an accessory gearbox that can accommodate the higher power requirements of modern aircraft.

DISCLOSURE OF THE INVENTION

According to the present invention, a mechanical drive system for an accessory gearbox of a gas turbine engine is provided. The engine has a high-pressure drive shaft and a low-pressure drive shaft. The first tower shaft is driven by the high-pressure drive shaft. The second tower shaft is driven by the low-pressure drive shaft. The first lay shaft is driven by the first tower shaft, and is connected to the accessory gearbox. The second lay shaft is driven by the second tower shaft, and is connected to the accessory gearbox.

One of the advantages of the present invention mechanical drive system for an accessory gearbox is that it provides increased versatility and capability over prior art mechanical drive systems that utilize a single tower shaft engaged with the high-pressure drive shaft. For example, the present invention has the capacity to draw power off of the low-pressure drive shaft and the high-pressure shaft alternatively, or at the same time.

These and other objects, features and advantages of the present invention will become apparent in light of the detailed description of the present invention.

DETAILED DESCRIPTION OF THE INVENTION

Figure 1:
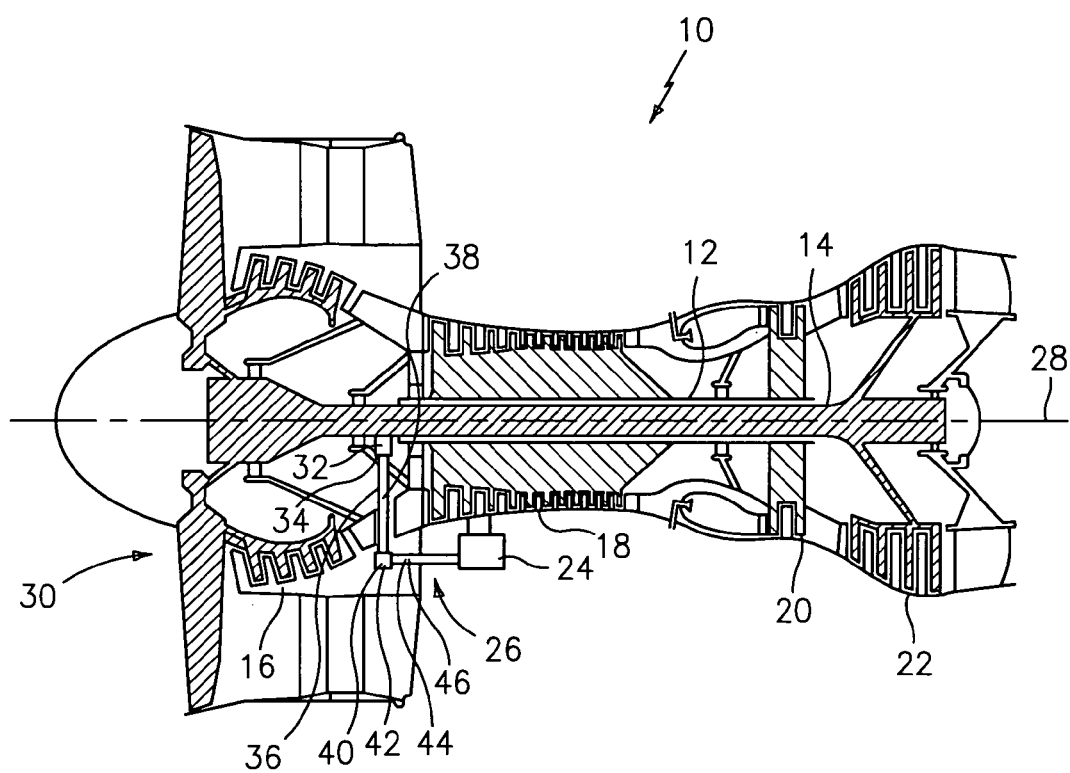
FIG. 1 is a diagrammatic view of a gas turbine engine.

Referring to FIG. 1, a gas turbine engine 10 is diagrammatically shown. The engine includes a high-pressure drive shaft 12, a low-pressure drive shaft 14, a low-pressure compressor 16, a high-pressure compressor 18, a high-pressure turbine 20, a low-pressure turbine 22, an accessory gearbox 24, and a mechanical drive system 26 for the accessory gearbox 24. The drive shafts 12,14, compressor sections 16,18, and turbine sections 20,22 are centered about an axially extending engine centerline 28.

The low-pressure compressor 16 is disposed axially forward of the high-pressure compressor 18, and the high pressure turbine 20 is positioned forward of the low-pressure turbine 22. The term forward is used to indicate position along the axially extending engine centerline. A first component "forward" of a second component is positioned closer to the inlet 30 of the engine 10. The second component is positioned "aft" of the first component. In most instances, gas flow traveling through the core of the engine 10 encounters the forward component before it encounters the aft component. The low-pressure and high-pressure compressor sections 16,18 and the high and low-pressure turbine sections 20,22 each includes a plurality of stator and rotor stages.

The high-pressure drive shaft 12 is connected to and extends between the high-pressure compressor 18 and the high-pressure turbine 20. The low-pressure drive shaft 14 is connected to and extends between the low-pressure compressor 16 and the low-pressure turbine 22. The high-pressure drive shaft 12 and the low-pressure drive shaft 14 rotate about the axially extending engine centerline 28. The drive shafts 12,14 are diagrammatically shown in FIG. 1 as concentric cylinders to simply illustrate the relationship between the components. Most low-pressure and high-pressure drive shafts are concentric, but have relatively complex geometries to accommodate all of the various components attached thereto and disposed adjacent thereto. The portions of the drive shafts 12,14 shown in FIG. 2 is illustrated with geometries more typical of those actually used within gas turbine engines.

Figure 2:
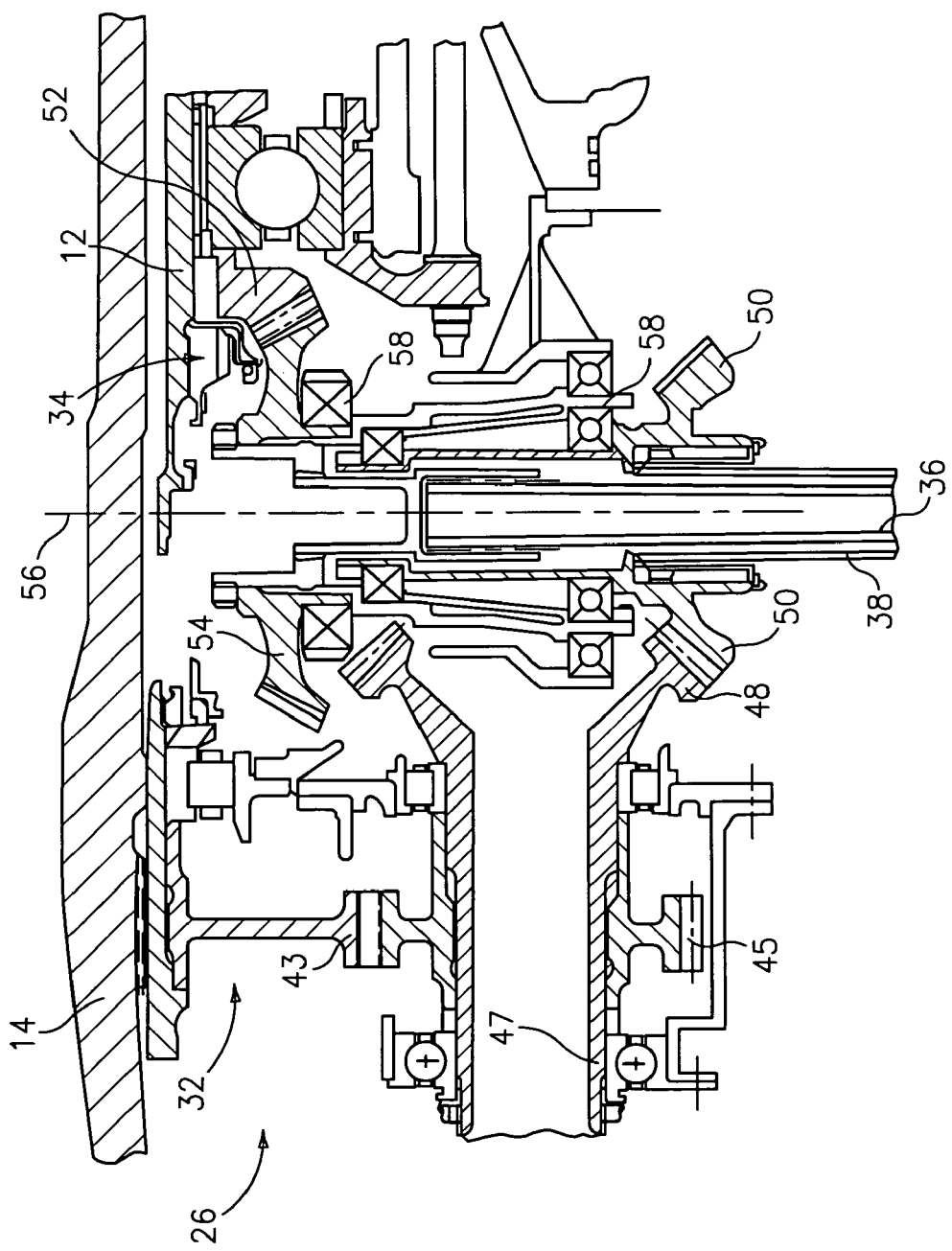
FIG. 2 is a diagrammatic sectional view illustrating an embodiment of the first and second tower shafts and associated gear arrangements.

Referring to FIGS. 1 and 2, the mechanical drive system 26 for the accessory gearbox 24 includes a low-pressure drive shaft gear arrangement 32 ("LPDS gear arrangement"), a high-pressure drive shaft gear arrangement 34 ("HPDS gear arrangement"), a first tower shaft 36, a second tower shaft 38, a first angle gear arrangement 40, a second angle gear arrangement 42, a first lay shaft 44, and a second lay shaft 46. The LPDS gear arrangement 32 includes a first spur gear 43, a second spur gear 45, an intermediate shaft 47, a first bevel gear 48, and a second bevel gear 50. The first spur gear is fixed (e.g., by one or more splines) to the low-pressure drive shaft 14. The second spur gear 45 and the first bevel gear 48 are attached to the intermediate shaft 47. The second spur gear 45 is engaged with the first spur gear 43. The first bevel gear 48 is engaged with the second bevel gear 50, which is fixed to the second tower shaft 38.

The HPDS gear arrangement 34 includes a third bevel gear 52 and a fourth bevel gear 54. The third bevel gear 52 is fixed (e.g., by one or more splines) to the high-pressure drive shaft 12. The third bevel gear 52 is engaged with the fourth bevel gear 54, which is fixed to the first tower shaft 36.

The first and second tower shafts 36,38 are concentrically arranged and rotatable about a lengthwise extending axis 56. The axis 56 is typically oriented perpendicular to (or at an acute angle therefrom) the engine centerline 28. The second tower shaft 38 is disposed radially outside of the first tower shaft 36 for substantially all of the portions in which the two tower shafts 36,38 are concentric. The first and second tower shafts 36,38 typically each include one or more bearing mounts 58 to positionally locate and to facilitate rotation of the respective tower shaft 36,38. Each tower shaft 36,38 may be a unitary shaft or it may include multiple sections connected together (e.g., by splines, etc.).

Figure 3:
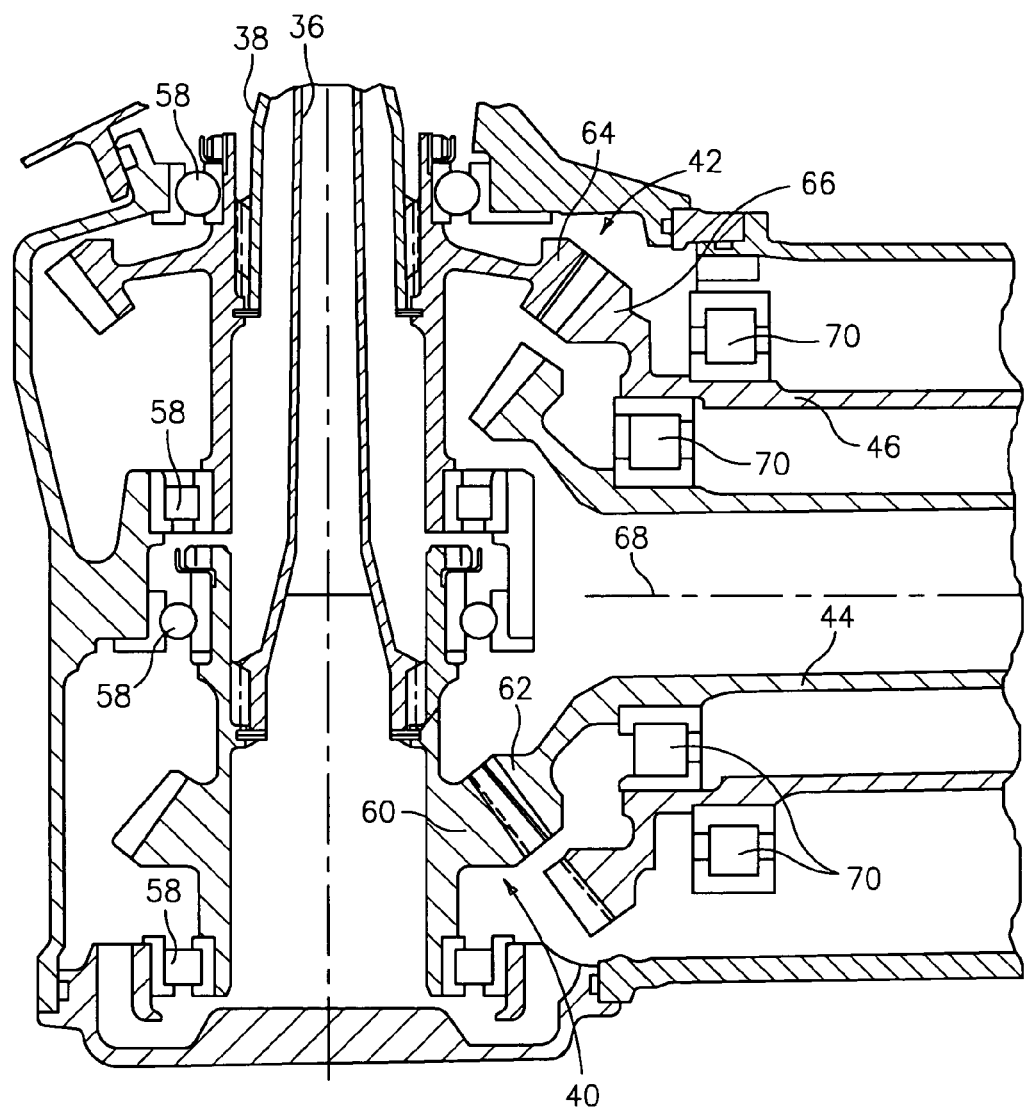
FIG. 3 is a diagrammatic sectional view illustrating an embodiment of the angle gear arrangement.

Now referring to FIG. 3, in a first embodiment the first and second angle gear arrangements 40,42 are configured for use with concentric tower shafts 36,38 and concentric lay shafts 44,46. In this embodiment, the first angle gear arrangement 40 includes a fifth bevel gear 60 and a sixth bevel gear 62, and the second angle gear arrangement 42 includes a seventh bevel gear 64 and an eighth bevel gear 66. The fifth bevel gear 60 is attached to the first tower shaft 36, and is engaged with the sixth bevel gear 62, which is attached to the first lay shaft 44. The seventh bevel gear 64 is attached to the second tower shaft 38, and is engaged with the eighth bevel gear 66, which is attached to the second lay shaft 46.

In the first embodiment, the first and second lay shafts 44,46 are concentrically arranged and rotatable about a lengthwise extending axis 68. The first lay shaft 44 is disposed radially inside of the second lay shaft 46 for substantially all of the portions in which the two lay shafts 44,46 are concentric. The first and second lay shafts 44,46 each typically include one or more bearing mounts 70 to positionally locate and to facilitate rotation of the respective lay shaft 44,46. Each lay shaft 44,46 may be a unitary shaft or it may include multiple sections connected together (e.g., by splines, etc.).

Figure 4:
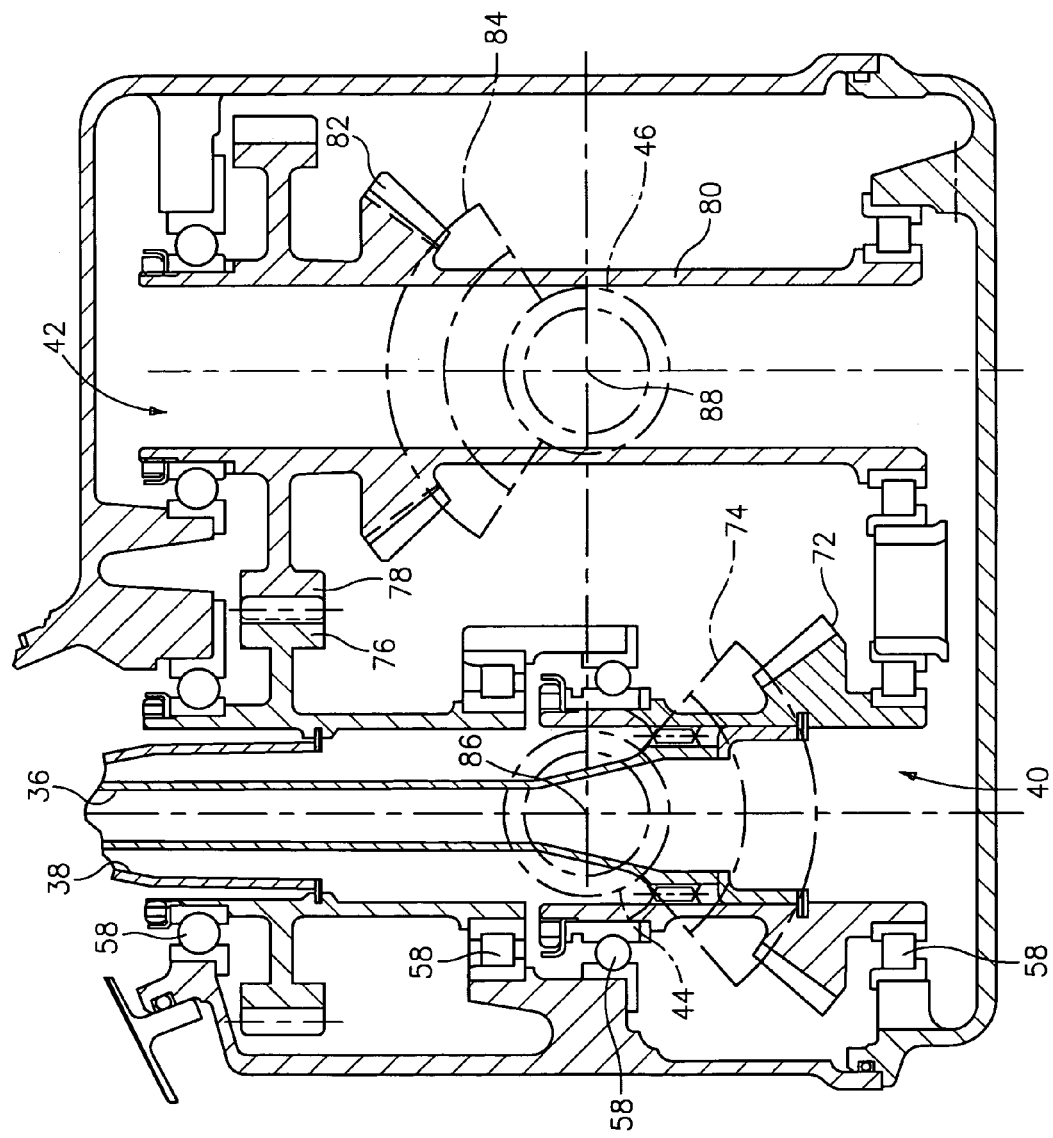
FIG. 4 is a diagrammatic sectional view illustrating an embodiment of the angle gear arrangement.
Figure 5:
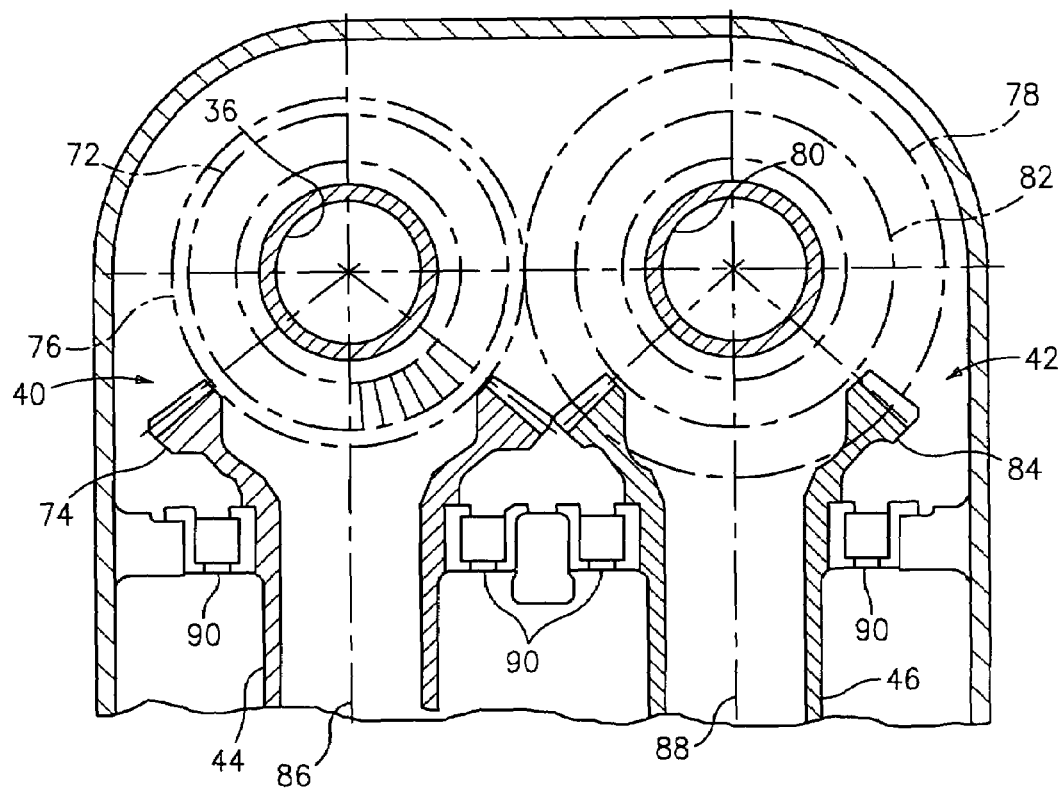
FIG. 5 is a diagrammatic sectional top view illustrating an embodiment of the angle gear arrangement shown in FIG. 4.

Now referring to FIGS. 4 and 5, in a second embodiment the first and second angle gear arrangements 40,42 are configured for use with concentric tower shafts 36,38 and side-by-side lay shafts 44,46. In this embodiment, the first angle gear arrangement 40 includes a ninth bevel gear 72 and a tenth bevel gear 74. The ninth bevel gear 72 is attached to the first tower shaft 36. The ninth bevel gear 72 is engaged with the tenth bevel gear 74, which is fixed to the first lay shaft 44. The second gear arrangement 42 includes a first spur gear 76, a second spur gear 78, an intermediate shaft 80, an eleventh bevel gear 82, and a twelfth bevel gear 84. The first spur gear 76 is fixed (e.g., by one or more splines) to the second tower shaft 38. The second spur gear 78 and the eleventh bevel gear 82 are attached to the intermediate shaft 80. The second spur gear 78 is aligned and engaged with the first spur gear 76. The eleventh bevel gear 82 is engaged with the twelfth bevel gear 84, which is fixed to the second lay shaft 46.

In the second embodiment, the first and second lay shafts 44,46 are disposed side-by-side, rotatable about lengthwise extending parallel axes 86,88. The first and second lay shafts 44,46 are shown in phantom in FIG. 4, extending out of the page. The parallel axes 86,88 along which the side-by-side lay shafts 44,46 extend, therefore also extend out of the page. The lay shafts 44,46 are shown extending lengthwise within the page, in the sectional top view of FIG. 5. The lay shafts 44,46 each include one or more bearing mounts 90 to positionally locate and to facilitate rotation of the respective lay shaft 44,46. A coupling (not shown) is attached to, or formed with, the other end of each lay shaft 44,46, for connecting the respective lay shaft to the accessory gearbox 24.

Referring to FIG. 2, in the operation of the engine 10 rotation of the low-pressure drive shaft 14 rotationally drives the LPDS gear arrangement 32. The LPDS gear arrangement 32, in turn, drives the second tower shaft 38 about its axis 56. Rotation of the high-pressure drive shaft 12 rotationally drives the HPDS gear arrangement 34. The HPDS gear arrangement 34, in turn, drives the first tower shaft 36 about its axis 56.

Referring to FIG. 3, in the first embodiment wherein the tower shafts 36,38 and the lay shafts 44,46 are concentric, rotation of the first tower shaft 36 causes the first angle gear arrangement 40 to rotate and drive the first lay shaft 44 (disposed radially inside of the second lay shaft 46). Rotation of the second tower shaft 38 causes the second angle gear arrangement 42 to rotate and drive the second lay shaft 46 (disposed radially outside of the first lay shaft 44). The concentric lay shafts 44,46, in turn, drive the accessory gearbox 24.

Referring to FIGS. 4 and 5, in the second embodiment wherein the tower shafts 36,38 are concentric and the lay shafts 44,46 side-by-side, rotation of the first tower shaft 36 causes the first angle gear arrangement 40 to drive the first lay shaft 44. Rotation of the second tower shaft 38 causes the second gear arrangement 42 to drive the second lay shaft 46. The second gear arrangement 42 connects the second lay shaft 46 (positioned side-by-side with, and therefor spaced apart from, the first lay shaft 44) to the second tower shaft 38 via the intermediate shaft 80. The side-by-side lay shafts 44,46, in turn, drive the accessory gearbox 24.

Although this invention has been shown and described with respect to the detailed embodiments thereof, it will be understood by those skilled in the art that various changes in form and detail thereof may be made without departing from the spirit and the scope of the invention. For example, the invention is described above using bevel gears and spur gears in certain configurations. The concentric and side-by-side configurations could also be accomplished using alternative gear arrangements.

What is claimed is:

1. A mechanical drive system for an accessory gearbox of a gas turbine engine, which engine has a high-pressure drive shaft and a low-pressure drive shaft, the drive system comprising:

a first tower shaft connected by a first gear arrangement to the high-pressure drive shaft;

a second tower shaft connected by a second gear arrangement to the low-pressure drive shaft, wherein the first tower shaft is concentric with the second tower shaft;

a first lay shaft connected by a third gear arrangement to the first tower shaft, and connected to the accessory gearbox, the third gear arrangement including a first bevel gear attached to the first tower shaft, and a second bevel gear attached to the first lay shaft, wherein the first bevel gear and the second bevel gear are engaged with one another;

a second lay shaft connected by a fourth gear arrangement to the second tower shaft, and connected to the accessory gearbox, wherein the first lay shaft is disposed spaced apart from and parallel to the second lay shaft;

wherein the fourth gear arrangement includes a first spur gear, a second spur gear, an intermediate shaft, a first bevel gear, and a second bevel gear, wherein the first spur gear is attached to the second tower shaft, and the second spur gear and the first bevel gear are attached to the intermediate shaft, and the second bevel gear is attached to the second lay shaft;

wherein the first spur gear and the second spur gear are engaged with one another; and wherein the first bevel gear and the second bevel gear are engaged with one another.

2. A mechanical drive system for an accessory gearbox of a gas turbine engine, which engine has a high-pressure drive shaft and a low-pressure drive shaft, the drive system comprising:

a first tower shaft driven by the high-pressure drive shaft;

a second tower shaft driven by the low-pressure drive shaft;

a first lay shaft driven by the first tower shaft, and connected to the accessory gearbox; and a second lay shaft driven by the second tower shaft, and connected to the accessory gearbox;

wherein the first lay shaft is disposed spaced apart from and parallel to the second lay shaft, and is connected to the second lay shaft by an intermediate shaft and a pair of spur gears wherein one spur gear is supported by the second tower shaft and the other spur gear is supported by the intermediate shaft.

3. The mechanical drive system of claim 2, wherein a first gear arrangement connects the first shaft to the first lay shaft, the first gear arrangement including a first bevel gear attached to the first tower shaft, and a second bevel gear attached to the first lay shaft, wherein the first bevel gear and the second bevel gear are engaged with one another.

4. The mechanical drive system of claim 2, wherein the first tower shaft and second tower shaft are concentric with one another.

5. A mechanical drive system for an accessory gearbox of a gas turbine engine, which engine has a high-pressure drive shaft and a low-pressure drive shaft, the drive system comprising:
   a first tower shaft driven by the high-pressure drive shaft;
   a second tower shaft driven by the low-pressure drive shaft;
   a first lay shaft driven by the first tower shaft, and connected to the accessory gearbox; and
   a second lay shaft driven by the second tower shaft, and connected to the accessory gearbox;
   wherein the first lay shaft is disposed spaced apart from and parallel to the second lay shaft, and is connected to the second lay shaft by an intermediate shaft and gear arrangement.

6. A gas turbine engine, comprising:
   a high-pressure drive shaft connected to a high-pressure compressor and a high-pressure turbine;
   a low-pressure drive shaft connected to a low-pressure compressor and a low-pressure turbine;
   wherein the high-pressure drive shaft and the low-pressure drive shaft rotate about an axially extending engine centerline;
   an accessory gear box;
   a first tower shaft driven by the high-pressure drive shaft, and connected to the accessory gearbox by a first lay shaft; and
   a second tower shaft driven by the low-pressure drive shaft, and connected to the accessory gearbox by a second lay shaft, wherein the first tower shaft is concentric with the second tower shaft;
   wherein the first lay shaft is disposed spaced apart from and parallel to the second lay shaft, and is connected to the second lay shaft by an intermediate shaft and a pair of spur gears wherein one spur gear is supported by the second tower shaft and the other spur gear is supported by the intermediate shaft.

\* \* \* \* \*

UNITED STATES PATENT AND TRADEMARK OFFICE
CERTIFICATE OF CORRECTION

PATENT NO. : 7,386,983 B2
APPLICATION NO. : 10/785502
DATED : June 17, 2008
INVENTOR(S) : Guy Wallace Miller It is certified that error appears in the above-identified patent and that said Letters Patent is hereby corrected as shown below:

On the Title Page:

The Assignee should read as follows:

(73) Assignee: United Technologies Corporation, Hartford, CT (US)

Signed and Sealed this

Twenty-fourth Day of March, 2009

JOHN DOLL
*Acting Director of the United States Patent and Trademark Office*